US011334644B2

(12) United States Patent
Jerdonek

(10) Patent No.: US 11,334,644 B2
(45) Date of Patent: May 17, 2022

(54) METHODS AND SYSTEMS FOR THREE-WAY MERGES OF OBJECT REPRESENTATIONS

(71) Applicant: Christopher J. Jerdonek, San Francisco, CA (US)

(72) Inventor: Christopher J. Jerdonek, San Francisco, CA (US)

(*) Notice: Subject to any disclaimer, the term of this patent is extended or adjusted under 35 U.S.C. 154(b) by 0 days.

(21) Appl. No.: 16/992,102

(22) Filed: Aug. 13, 2020

(65) Prior Publication Data

US 2021/0073313 A1 Mar. 11, 2021

Related U.S. Application Data

(60) Provisional application No. 62/886,765, filed on Aug. 14, 2019, provisional application No. 62/886,758, (Continued)

(51) Int. Cl.
*G06F 16/23* (2019.01)
*G06F 16/958* (2019.01)
(Continued)

(52) U.S. Cl.
CPC .......... *G06F 16/986* (2019.01); *G06F 16/219* (2019.01); *G06F 16/9035* (2019.01); *G06F 40/174* (2020.01); *G06F 16/2329* (2019.01)

(58) Field of Classification Search
CPC .......... G06F 16/10; G06F 16/20; G06F 16/30; G06F 16/80; G06F 16/90; G06F 40/10;
(Continued)

(56) References Cited

U.S. PATENT DOCUMENTS

2006/0224607 A1\* 10/2006 Tchaitchian .......... G06F 40/154
2009/0150394 A1\* 6/2009 Bailor .................. G06F 40/197
(Continued)

OTHER PUBLICATIONS

"Pros and Cons of Using Markdown for Technical Writing", by Murali S, referred to as Murali in the Office Action, published Nov. 12, 2018, and retrieved from https://hackernoon.com/pros-and-cons-of-using-markdown-for-technical-writing-34f277418a8a (Year: 2018).\*

*Primary Examiner* — Sanchita Roy

(57) ABSTRACT

In one aspect, a method for automatically merging changes to a web page document, includes the step of providing an object of a web page document. The method includes determining an object type of the object of the web page document. The web page document is coded in a markup language. The method includes selecting a set of attributes of the object type that are to be taken into account during a merging operation involving a plurality of changes to the object. Given the object of the object type, the method includes receiving a plurality of changes to the object. The plurality of changes comprises a first set of changes and a second set of changes. The method includes the step of generating a key-value mapping for an original object. The set of attributes is used to associate with the object a key-value mapping. The key-value mapping includes, for each attribute of the set of attributes a key-value of the mapping, where the name of the attribute is the mapping key and the value of the attribute is the mapping value. The method includes generating a key-value mapping for the object after the first set of changes. The method includes generating a key-value mapping for the object after the second set of changes. The method includes constructing a merged version of the object that incorporates the plurality of changes to the object by: constructing a merged key-value mapping of attributes from the key-value mapping of the original object, the key-value mapping of the object after the
(Continued)

first set of changes, and the key-value mapping of the object after the second set of changes, combining all of the merged attribute values, and using the attribute names as the keys.

20 Claims, 15 Drawing Sheets

Related U.S. Application Data filed on Aug. 14, 2019, provisional application No. 62/886,738, filed on Aug. 14, 2019.

(51) Int. Cl.
   *G06F 40/174* (2020.01)
   *G06F 16/9035* (2019.01)
   *G06F 16/21* (2019.01)

(58) Field of Classification Search
   CPC .... G06F 16/986; G06F 16/219; G06F 40/174; G06F 16/9035; G06F 16/2329; G06F 40/194; G06F 40/197; G06F 16/1873; G06F 40/166; G06F 16/93; G06F 16/958
   See application file for complete search history.

(56) References Cited

U.S. PATENT DOCUMENTS

| | | | |
|---|---|---|---|
| 2010/0088676 A1* | 4/2010 | Yuan | G06F 16/80 717/120 |
| 2010/0318922 A1* | 12/2010 | Strathearn | G06F 16/345 715/751 |
| 2011/0066626 A1* | 3/2011 | Dharmalingam | G06F 40/174 707/758 |
| 2015/0113448 A1* | 4/2015 | Underwood | G06Q 30/0641 715/760 |
| 2016/0034433 A1* | 2/2016 | Yamat | G06F 40/194 715/229 |
| 2017/0060936 A1* | 3/2017 | Gammans | G06F 16/2358 |

* cited by examiner

| | |
|---|---|
| $O_O$ | {"bold": True, "font": "Helvetica", "italics": $v_{absent}$, "size": 12, "text": "Hello, world"} |
| $O_A$ | {"bold": $v_{absent}$, "font": "Courier", "italics": $v_{absent}$, "size": 12, "text": "Hello, world"} |
| $O_B$ | {"bold": True, "font": "Times", "italics": True, "size": 16, "text": "Goodbye, world"} |

500

| $O_M$ | {"bold": $v_{absent}$, "font": "Courier", "italics": True, "size": 16, "text": "Goodbye, world"} |

METHODS AND SYSTEMS FOR THREE-WAY MERGES OF OBJECT REPRESENTATIONS

CLAIM OF PRIORITY AND INCORPORATION BY REFERENCE

This application claims priority from U.S. Provisional Application No. 62/886,738, filed 14 Aug. 2019. This application is hereby incorporated by reference in its entirety for all purposes.

This application claims priority from U.S. Provisional Application No. 62/886,765, filed 14 Aug. 2019. This application is hereby incorporated by reference in its entirety for all purposes.

This application claims priority from U.S. Provisional Application No. 62/886,758, filed 14 Aug. 2019. This application is hereby incorporated by reference in its entirety for all purposes.

1. FIELD OF THE INVENTION

The invention is in the field of automated management of web page documents and more specifically to a method, system and apparatus for three-way merges of object representations.

2. BACKGROUND

The need for three-way merges can arise in any collaboration system that allows multiple independent sets of changes to be proposed to the same document, either asynchronously or at the same time. If different users independently propose different changes, there is often a desire to combine the changes. If the changes are, on the surface, incompatible with one another, the changes are said to be conflicting and are called "conflicts." Not handling conflicts well can cause users' changes to be lost and other issues.

Many products and technologies have been created to facilitate collaboration systems, and various strategies have been used to manage conflicting changes. For example, Wikipedia is an online encyclopedia maintained by a community of volunteer editors. Wikipedia avoids conflicts by imposing the limitation that changes to an encyclopedia article must be added sequentially. This means that only one user can prepare an edit at a time.

A second approach used by systems like Google Docs is to allow real-time editing of a central document. In this approach, small changes are saved to the central document as the user types. While real-time editing decreases the likelihood of conflicts, conflicts are still possible. A disadvantage of this approach is that large changes can't be prepared in advance, and it doesn't scale well as the number of users grows. Technologies like operational transformation (OT) have been applied to assist in this setting.

A third approach is to allow changes to be conditionally added to a document (e.g. by including them in the margin). Document owners can then review and accept the changes at a later time. This approach is also supported by systems like Google Docs. However, this process can face challenges as the number of users grows; as the size, number, or complexity of proposed changes increases; and if the original document changes before changes are accepted.

A fourth approach is the process used by many software engineers to collaborate on source code and related files. In this approach, a source control system like Git, Subversion, or Mercurial is used, often in conjunction with a website like GitHub. This setting tends to be different though because the target audience is more technical. Software engineers often use command-line tools like diff3 to merge changes, and they can be expected to handle conflicting changes manually. Also, source code files lack formatting, and tools in this setting commonly recognize changes only at a line level.

Each of the approaches above has trade-offs and limitations. Accordingly, there is a need for improved systems and methods of merging changes when collaborating online on web page documents, and more generally of performing three-way merges.

SUMMARY OF THE INVENTION

In one aspect, a method for automatically merging changes to a web page document, includes the step of providing an object of a web page document. The method includes determining an object type of the object of the web page document. The web page document is coded in a markup language. The method includes selecting a set of attributes of the object type that are to be taken into account during a merging operation involving a plurality of changes to the object. Given the object of the object type, the method includes receiving a plurality of changes to the object. The plurality of changes comprises a first set of changes and a second set of changes. The method includes the step of generating a key-value mapping for an original object. The set of attributes is used to associate with the object a key-value mapping. The key-value mapping includes, for each attribute of the set of attributes a key-value of the mapping, where the name of the attribute is the mapping key and the value of the attribute is the mapping value. The method includes generating a key-value mapping for the object after the first set of changes. The method includes generating a key-value mapping for the object after the second set of changes. The method includes constructing a merged version of the object that incorporates the plurality of changes to the object by: constructing a merged key-value mapping of attributes from the key-value mapping of the original object, the key-value mapping of the object after the first set of changes, and the key-value mapping of the object after the second set of changes, combining all of the merged attribute values, and using the attribute names as the keys.

BRIEF DESCRIPTION OF THE DRAWINGS

FIG. 6 illustrates a merged key-value mapping, according to some embodiments.

Figure 1:
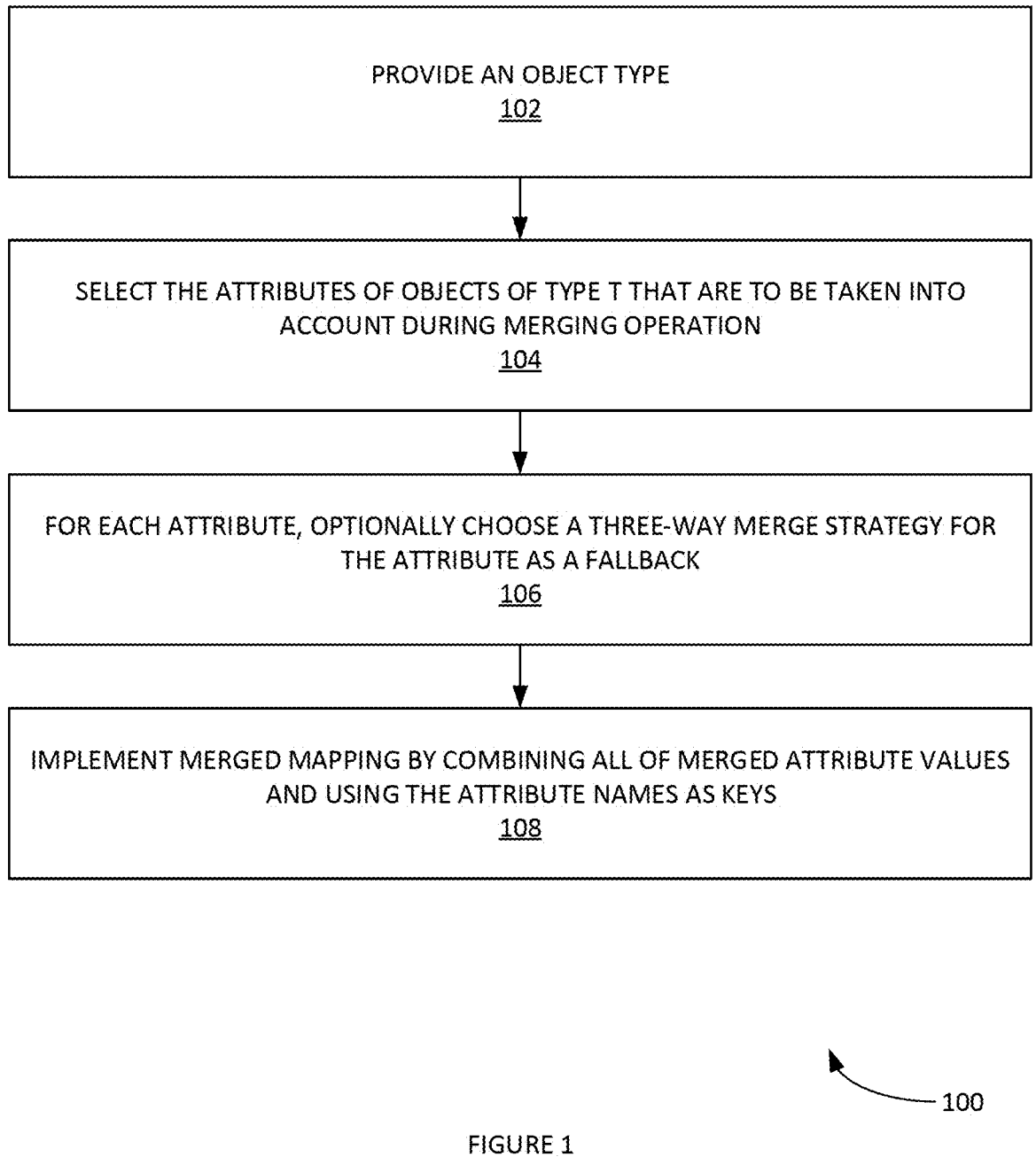
FIG. 1 illustrates an example process for merging changes to objects, according to some embodiments.

The Figures described above are a representative set and are not exhaustive with respect to embodying the invention.

DESCRIPTION

Disclosed are a system, method, and article of manufacture for implementing three-way merges of object representations. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' an embodiment,' 'one example,' or similar language means that a particular feature, structure, or characteristic described in connection with the embodiment is included in at least one embodiment of the present invention. Thus, appearances of the phrases 'in one embodiment,' in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, markup languages, documents, software modules, user selections, network transactions, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. For example, various arrow types and line types may be employed in the flow chart diagrams. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Collaboration system is any website or other system that allows multiple users to collaborate together on editing the same web page document.

diff3 is a Unix utility to compare three text files and show any differences among them. diff3 can also merge text files, implementing a three-way merge.

Hypertext Markup Language (HTML) is the standard markup language for documents designed to be displayed in a web browser. HTML can be assisted by technologies such as Cascading Style Sheets (CSS) and scripting languages such as JavaScript, and it can incorporate multimedia elements like images and video by reference.

Markdown is a lightweight markup language with plain-text-formatting syntax.

Three-way merge can be the act of combining or "merging" two distinct sets of changes to an original representation of an object to create a new representation. For example, there can be a document D containing a word W. Person A can make a change to a copy of D by changing the formatting of W, and Person B separately makes a change to a different copy of D by also changing the formatting of W, possibly in a different way. A three-way merge can provide a way of intelligently combining the changes to W made by A and the changes made by B, even though those changes were made to the same word. The result is a new formatting of the word W that incorporates the changes of both A and B.

Web page can be a specific collection of information provided by a website and displayed to a user in a web browser. A website can include a set of web pages linked together in a coherent fashion. An example web page can include one or more text files written in HTML. Additionally, web pages can use JavaScript code for dynamic behavior and CSS code for presentation semantics. A web page can include, inter alia: images, videos, and other multimedia files are also often embedded in web pages.

Example Methods

If O is an object of type T, the term attribute can be used to refer to a property, characteristic, or other feature of O that one would like to take into account in a three-way merge. In this case, the attribute can be both an attribute of O and an attribute of T. For example, if O is an image in a document, examples of possible attributes of O (and of the image type) include things like the image's height, the image's width, the image's alignment (e.g. left, right, or centered), and the caption text associated with the image, if any. In another example, if O is a word in a document, examples of possible attributes include things like the word's font, the word's font size, the color of the word, and whether the word is in bold. Every attribute should have a name, and that name should be unique among all attributes for a given object type. Every attribute should also have a set of possible values it can take on. For example, for the attribute of width for an image, the name might be width, and the possible values might be the set of positive integers, where the integer represents the width in the number of pixels. As another example, if the property of being bold is an attribute of a word, bold can be the name, and the set of possible values could be the Boolean values True and False. Process 100 can also define a pseudo-value $v_{absent}$ to represent the absence of an attribute from an object. Process 100 permits $v_{absent}$ to be among the possible values for an attribute. For example, using $v_{absent}$ provides an alternate way of encoding the attribute bold. In this case, the possible values can be the single Boolean value True along with the pseudo-value $v_{absent}$. The rationale for this alternate approach is that boldness doesn't have any modifiers if it is present. A three-way merge strategy for an attribute R is a way of choosing a merged attribute value $v_M$ of R given an original attribute value $v_O$ and possibly different values $v_A$ and $V_B$. For example, if caption text is an attribute of an image, a possible merge strategy is to use the diff3 algorithm or some variant. An example of a trivial merge strategy can be to always choose $v_A$ (or similarly, to always choose $V_B$).

FIG. 1 illustrates an example process 100 for merging changes to objects, according to some embodiments. In step 102, process 100 can provide an object type. For example, let T be an object type (e.g. a word, an image, a document, etc.). Process 100 can merge changes to objects of type T. The merging of changes can be performed during a merging operation of multiple edits to the content of a web-page document in an online encyclopedia, collaboration system, or other web site with collaboratively generated and managed web pages. For example, a word or phrase on a collaboratively managed web page can be edited independently by more than one user.

In step 104, process 100 can select the attributes of objects of type T that are to be taken into account during the merging operation. Given an object O of T, this choice of attributes enables process 100 to associate a key-value mapping with O (e.g. as provided by process 200, etc.). Also, for each attribute R, process 100 can optionally choose a three-way merge strategy for R in step 106. This can be a fallback merge strategy for R.

Figure 2:
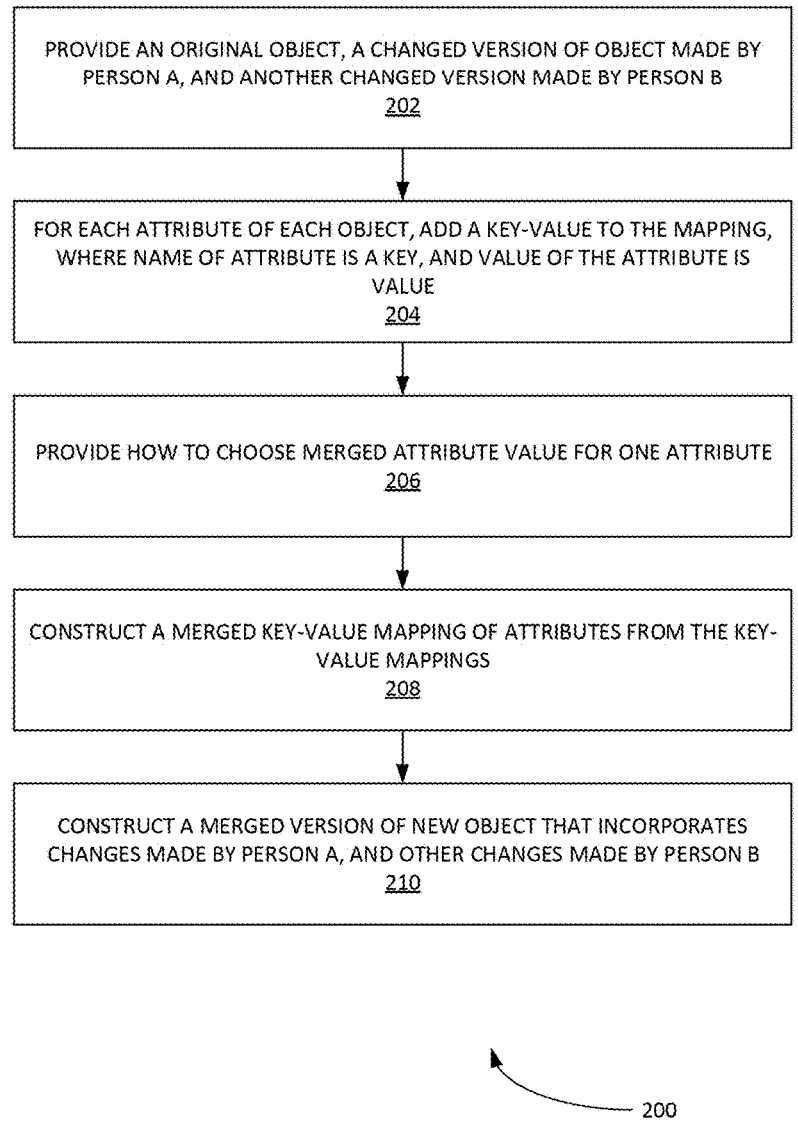
FIG. 2 illustrates an example process for merging changes to an object of a particular type, according to some embodiments.

FIG. 2 illustrates an example process 200 for merging changes to an object of type T, according to some embodiments. Process 200 can take into account each attribute selected in step 104.

In step 202, process 200 can provide an original object, a changed version of the object made by Person A, and another changed version made by Person B. For example, let $O_O$ be the original object, let $O_A$ be a changed version made by Person A, and let $O_B$ be a changed version made by Person B.

Process 200 can construct a key-value mapping for each object provided in step 202. In step 204, for each attribute of each object, process 200 can add a key-value to the mapping for the object, where the name of the attribute is the key, and the value of the attribute is the value.

In step 206, process 200 can provide how to choose a merged attribute value for one attribute. In step 208 process 200 can construct a merged key-value mapping of attributes from the key-value mappings (e.g. for $O_O$, $O_A$, and $O_B$).

In step 210 process 200 can construct a merged version of the new object that incorporates the changes made by Person A, and the other changes made by Person B. For example, process 200 can construct a new object $O_M$ as the merged version. Merged version $O_M$ can incorporate both sets of changes. The output of process 200 can be returned to step 108 of process 100.

Accordingly, in step 108, the merged mapping can then be constructed by combining all of the merged attribute values and using the attribute names as the keys. Processes 100 and 200 can be implemented with a web application for merging independent, asynchronous changes to formatted documents and other web page content, like those represented using HTML and other markup languages.

Figure 3:
FIG. 3 illustrates an example table showing what the attribute value $v_M$ should be, or if the fallback merge strategy for R should be used, according to some embodiments.

Thus, consider a single attribute R of T. Let $v_O$, $v_A$, and $v_B$ be the values of the attribute R in $O_O$, $O_A$, and $O_B$, respectively. It can be shown how to compute the merged value (e.g. herein $v_M$). Referring to FIG. 3, a table 300 is provided that shows what the value $v_M$ should be, or if the fallback merge strategy for R should be used, according to some embodiments. The two rows correspond to two mutually exclusive possibilities for the value of $v_A$, namely (1) $v_A$ equal to $v_O$ and (2) $v_A$ not equal to $v_O$, respectively. The three columns correspond to three mutually exclusive possibilities for $v_B$, namely (1) $v_B$ equal to $v_O$, (2) $v_B$ equal to $v_A$ (and not equal to $v_O$), and (3) $v_B$ equal to neither $v_O$ nor $v_A$. The cell with "N/A" (for "not applicable") corresponds to the case that logically can't arise. Table 300 shows how to choose the value of $v_M$ given the value of $v_A$ (the rows) and $v_B$ (the columns).

FIGS. 4-7 illustrate an example application of three-way merges of object representations, according to some embodiments. The present example includes an implementation of processes 100 and 200 where the object type is formatted text. The following attributes are selected:

bold: to represent whether the text is bold, with possible values $v_{absent}$ and True;
font: to represent the font, with possible values Helvetica, Courier, and Times.
italics: to represent whether the text is italicized, with possible values $v_{absent}$ and True;
size: to represent the font size, with positive integers as the possible values;
text: to represent the characters without any formatting information.

Also, for each attribute, the fallback merge strategy can be selected as the strategy of always choosing the value $v_A$.

Figure 4:
FIG. 4 illustrates an example table with an original object $O_O$ and changed versions $O_A$ and $O_B$, according to some embodiments.
Figure 5:
FIG. 5 illustrates an example table of associated key-value mappings, according to some embodiments.

Accordingly, FIG. 4 illustrates an example table 400 with an original object $O_O$ and changed versions $O_A$ and $O_B$, according to some embodiments. FIG. 5 illustrates the associated key-value mappings of the present example, according to some embodiments.

Figure 7:
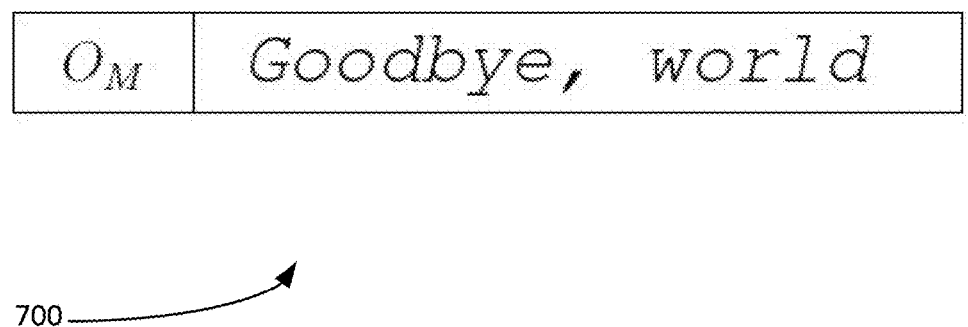
FIG. 7 illustrates a merged object $O_M$, according to some embodiments.

FIG. 6 illustrates the merged key-value mapping of the present example, according to some embodiments. As shown, only in the case of the font attribute was the fallback merge strategy used for choosing $v_A$. FIG. 7 illustrates the merged object $O_M$ of the present example, according to some embodiments.

Example Computing Systems

Figure 8:
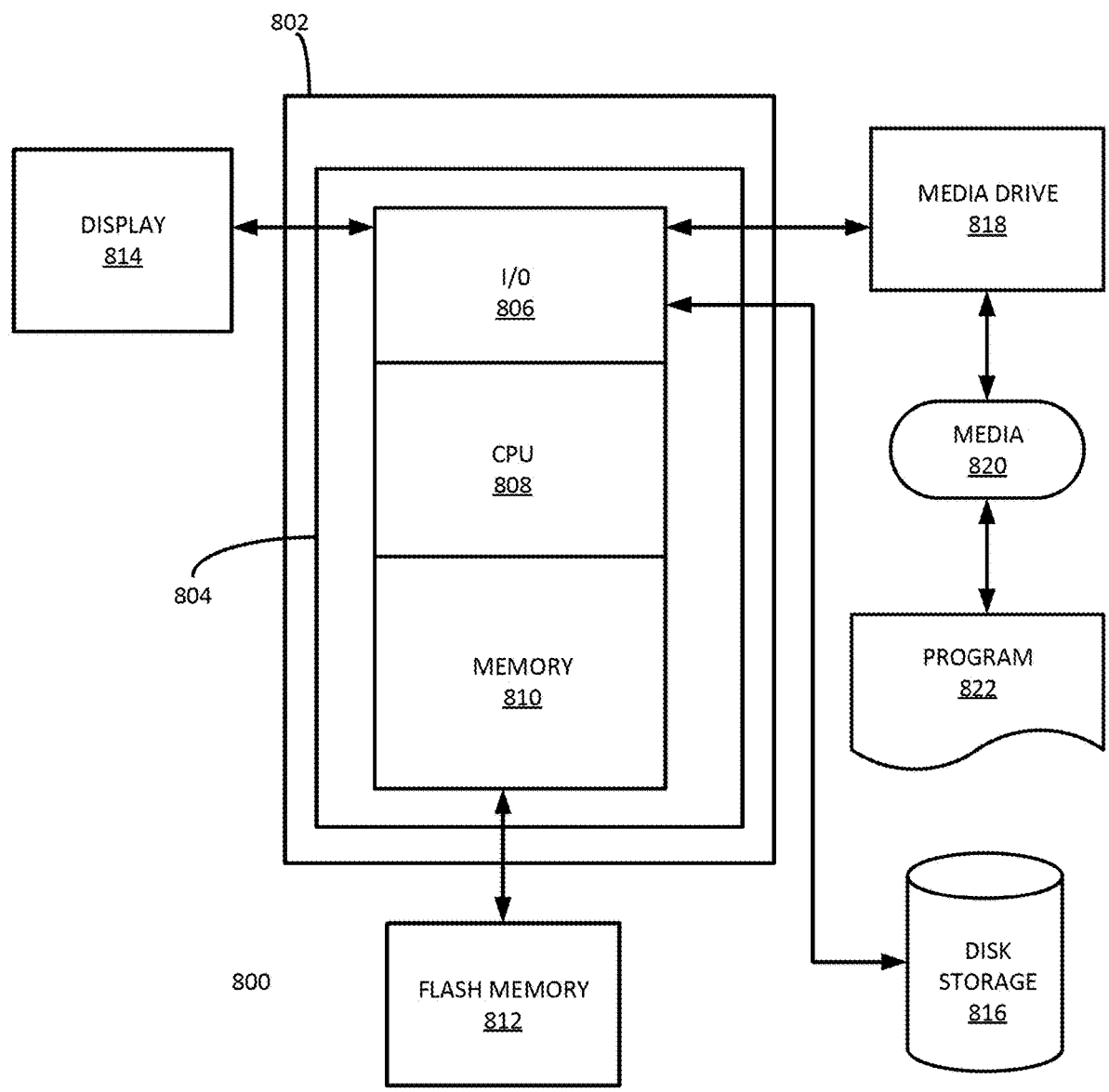
FIG. 8 depicts an exemplary computing system that can be configured to perform any one of the processes provided herein.

FIG. 8 depicts an exemplary computing system 800 that can be configured to perform any one of the processes provided herein. In this context, computing system 800 may include, for example, a processor, memory, storage, and I/O devices (e.g., monitor; keyboard, disk drive, Internet connection, etc.). However, computing system 800 may include circuitry or other specialized hardware for carrying out some or all aspects of the processes. In some operational settings, computing system 800 may be configured as a system that includes one or more units, each of which is configured to carry out some aspects of the processes either in software, hardware, or some combination thereof.

FIG. 8 depicts computing system 800 with a number of components that may be used to perform any of the processes described herein. The main system 802 includes a motherboard 804 having an I/O section 806, one or more central processing units (CPU) 808, and a memory section 810, which may have a flash memory card 812 related to it. The I/O section 806 can be connected to a display 814, a keyboard and/or other user input (not shown), a disk storage unit 816, and a media drive unit 818. The media drive unit 818 can read/write a computer-readable medium 820, which can contain programs 822 and/or data. Computing system 800 can represent either or both of a web server and web client (e.g. containing a web browser), for example. Moreover, it is noted that computing system 800 can be configured to include additional systems in order to fulfill various functionalities. Computing system 800 can communicate with other computing devices based on various computer communication protocols such a Wi-Fi, Bluetooth® (and/or other standards for exchanging data over short distances includes those using short-wavelength radio transmissions), USB, Ethernet, cellular; an ultrasonic local area communication protocol, etc.

Figure 9:
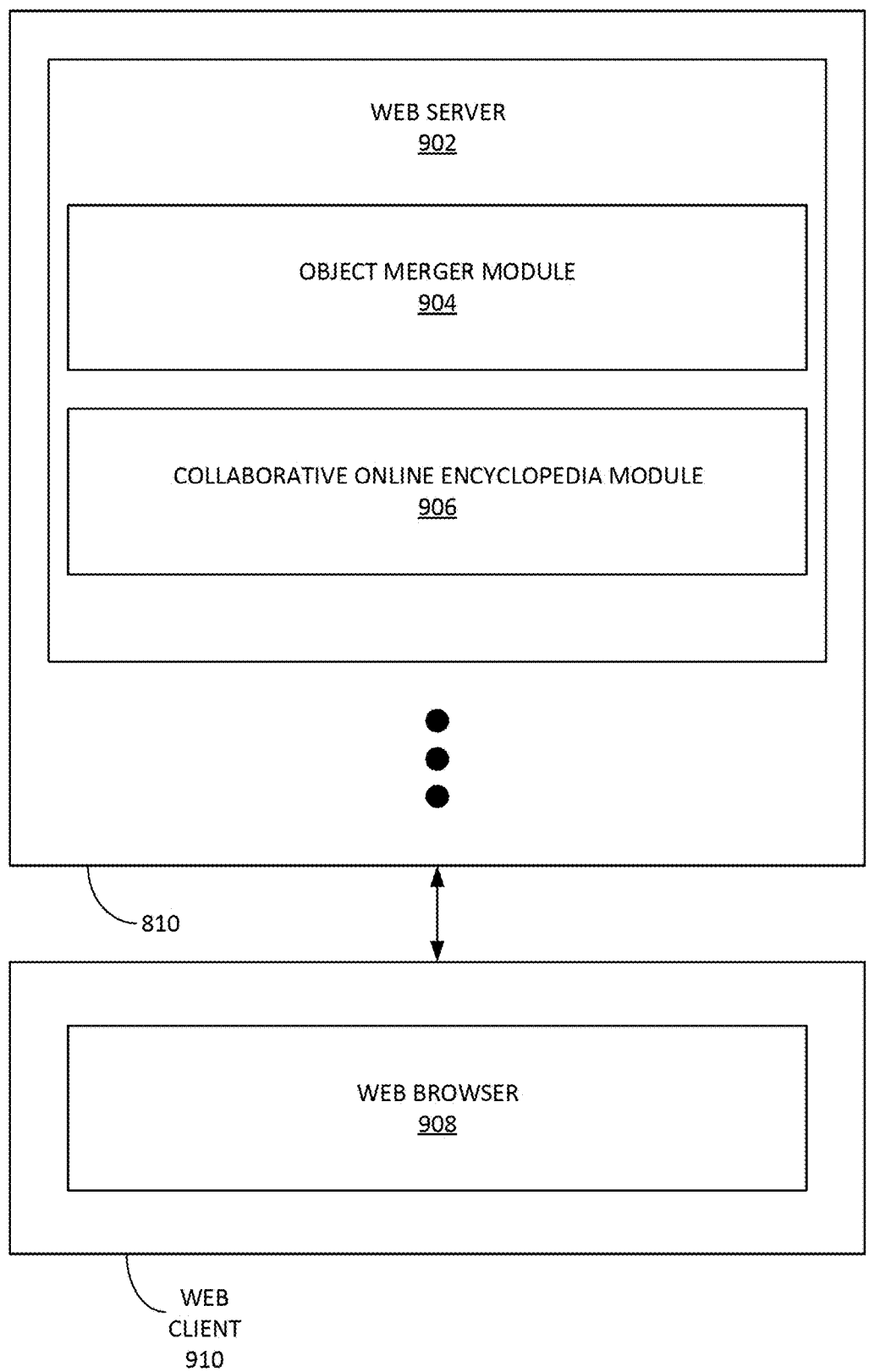
FIG. 9 illustrates an example set of modules stored in computer memory, according to some embodiments.

FIG. 9 illustrates an example set of modules 902-906 stored in memory 810, according to some embodiments. Modules 902-906 can be used for implementing three-way merges of object representations. A web server 902 can store, process and deliver web pages to a web client 910 containing a web browser 908. Web server 902 can contain one or more websites and associated web documents and satisfy client requests on the World Wide Web. Web server 902 can manage said web documents (e.g. by processing incoming network requests over HTTP and several other related protocols, interfacing with module 904 and 906, etc.). The web documents can be web pages such as, inter alia: HTML documents with digital images, style sheets and scripts, text content, markup language content, etc.

Object merger module 904 located in web server 902 can manage merging changes to an object of a web page document stored in web server 902. Object merger module 904 can implement processes 100-700.

Collaborative online encyclopedia module 906 inside web server 902 can manage an online encyclopedia available on the World Wide Web. Collaborative online encyclopedia module 906 can provide users via web browsers 908 editing tools for updating and adding content to the online encyclopedia. Collaborative online encyclopedia module 906 can use object merger module 904 to manage the merging of objects when there are conflicts in the editing of a web page of the online encyclopedia. It is noted that an editor can be a human user and/or an automated/semi-automated edit bot.

Example Use Cases

An example use case is now described. This use case can be implemented by processes 100-700 and modules 902-906.

Figure 10:
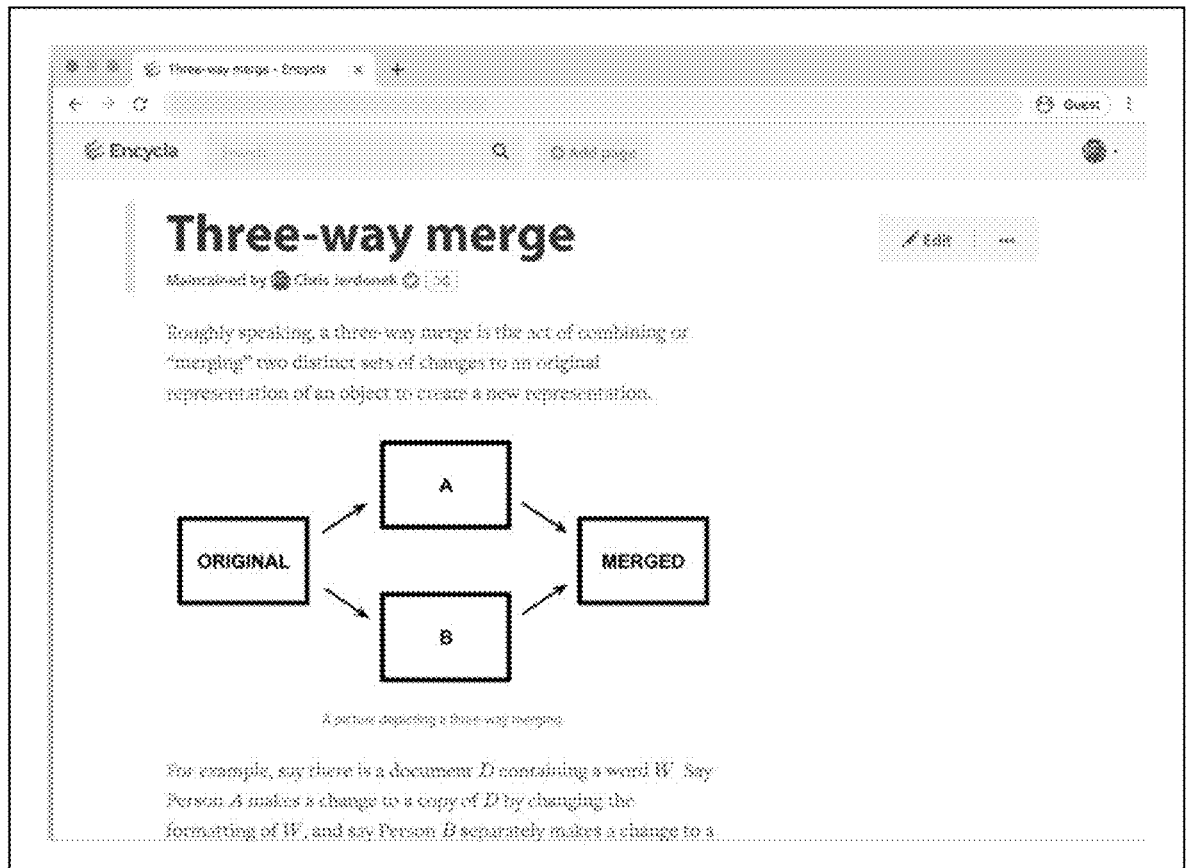
FIG. 10 shows a screenshot of a browser window showing an example of what it looks like to view an encyclopedia article in a collaborative online encyclopedia, according to some embodiments.

FIG. 10 shows a screenshot 1000 of a browser window showing an example of what it looks like to view an encyclopedia article in a collaborative online encyclopedia, according to some embodiments. In the present example, the online encyclopedia is called Encycla (e.g. located at encycla.com). The article is a sample article with the title "Three-way merge." This screenshot can also serve as the original version of the article in the series of screenshots described below that show an example three-way merge when using the collaborative online encyclopedia.

Figure 11:
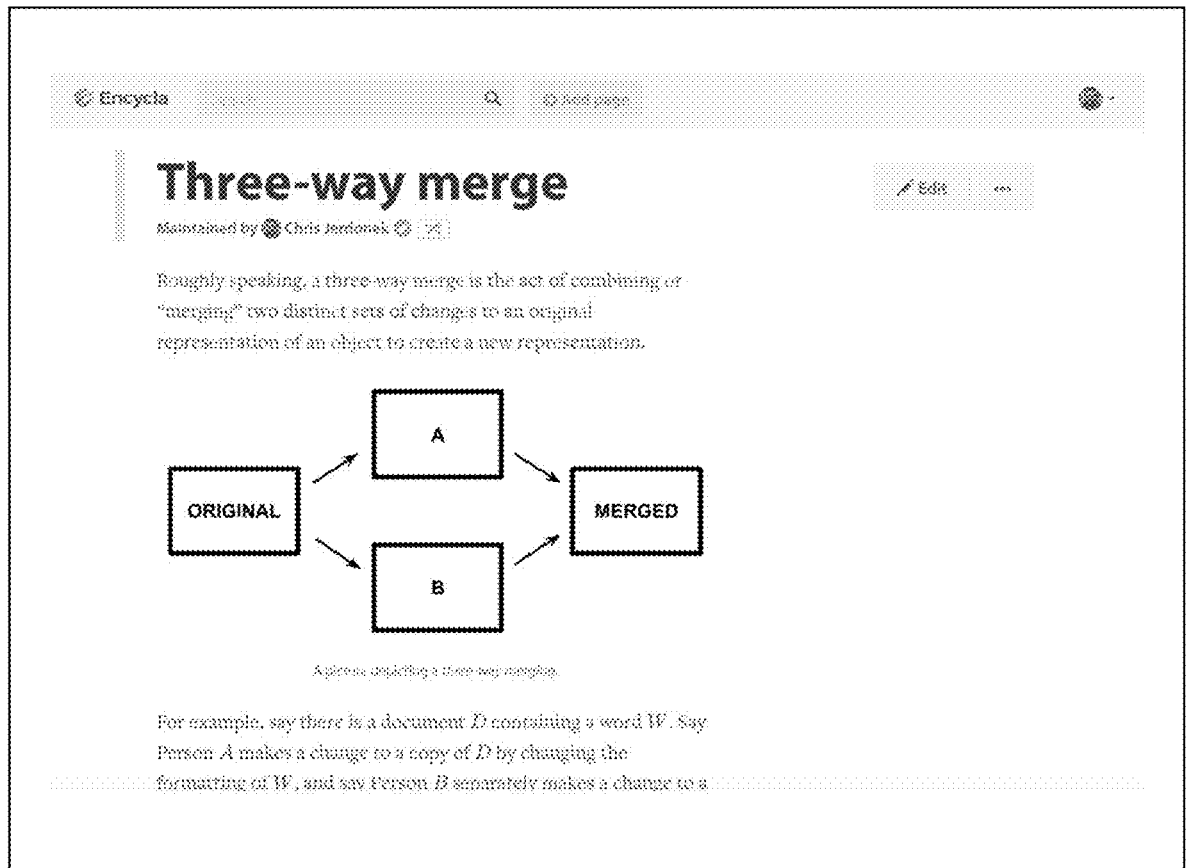
FIG. 11 shows a screenshot of version A of the article in the series of screenshots showing an example three-way merge, according to some embodiments.

FIG. 11 shows a screenshot 1100 of version A of the article in the series of screenshots showing an example three-way merge, according to some embodiments. Version A was made by making the following change to the original version shown in FIG. 10: italicizing the phrase "three-way merging" in the figure caption text.

Figure 12:
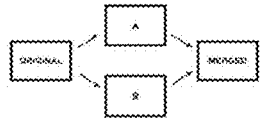
FIG. 12 shows a screenshot of version B of the article in the series of screenshots showing an example three-way merge, according to some embodiments.

FIG. 12 shows a screenshot 1200 of version B of the article in the series of screenshots showing an example three-way merge, according to some embodiments. Version B was made by making the following two changes to the original version shown in FIG. 10: changing the figure's alignment from being centered to being on the right and changing the word "merging" to "merge" in the figure caption text.

Figure 13:
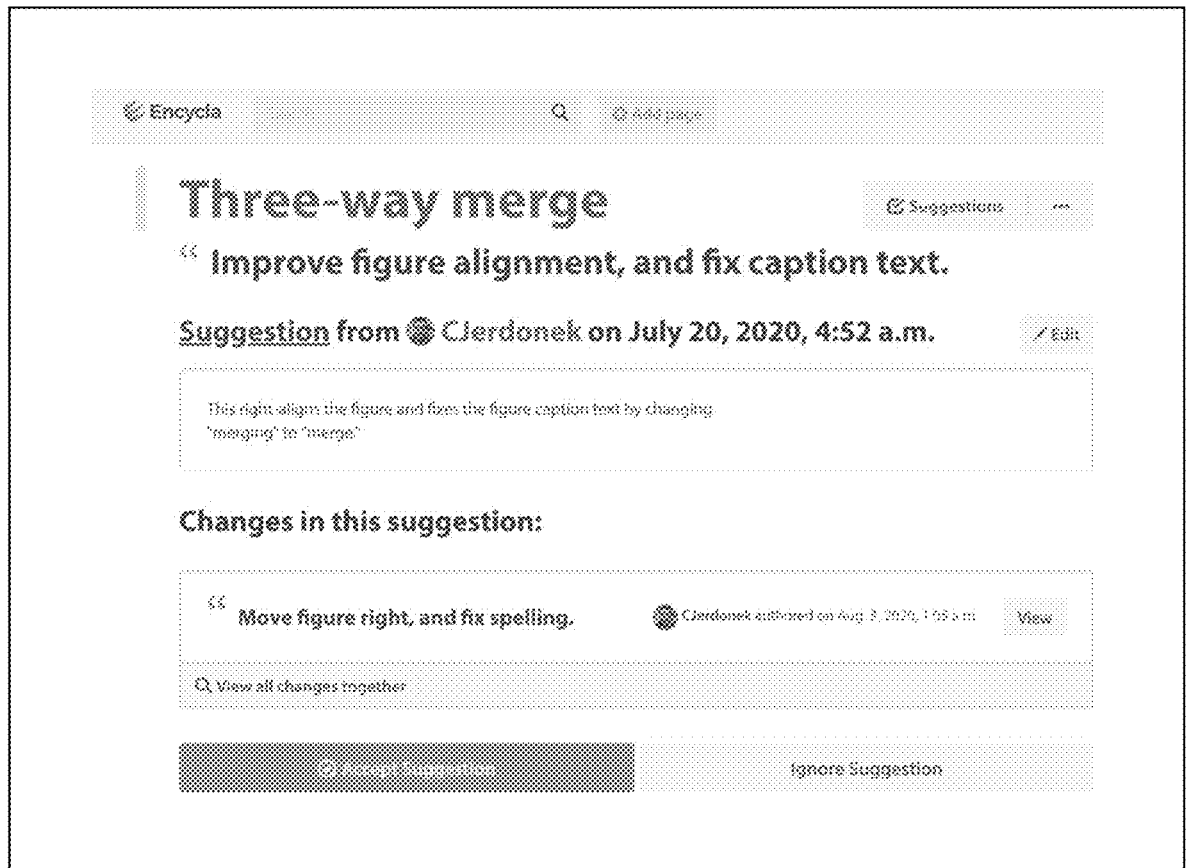
FIG. 13 shows a screenshot of the dialog box in a collaborative encyclopedia that lets a user perform an automated three-way merge using the method(s) described in this patent application, according to some embodiments.

FIG. 13 shows a screenshot 1300 of the dialog box in a collaborative encyclopedia that lets a user perform an automated three-way merge using the method(s) described in this patent application, according to some embodiments. In this case, the three-way merge is a three-way merge of the document whose original version is shown in FIG. 10, whose version A is shown in FIG. 11, and whose version B is shown in FIG. 12. To perform the three-way merge, the user clicks "Accept Suggestion."

Figure 14:
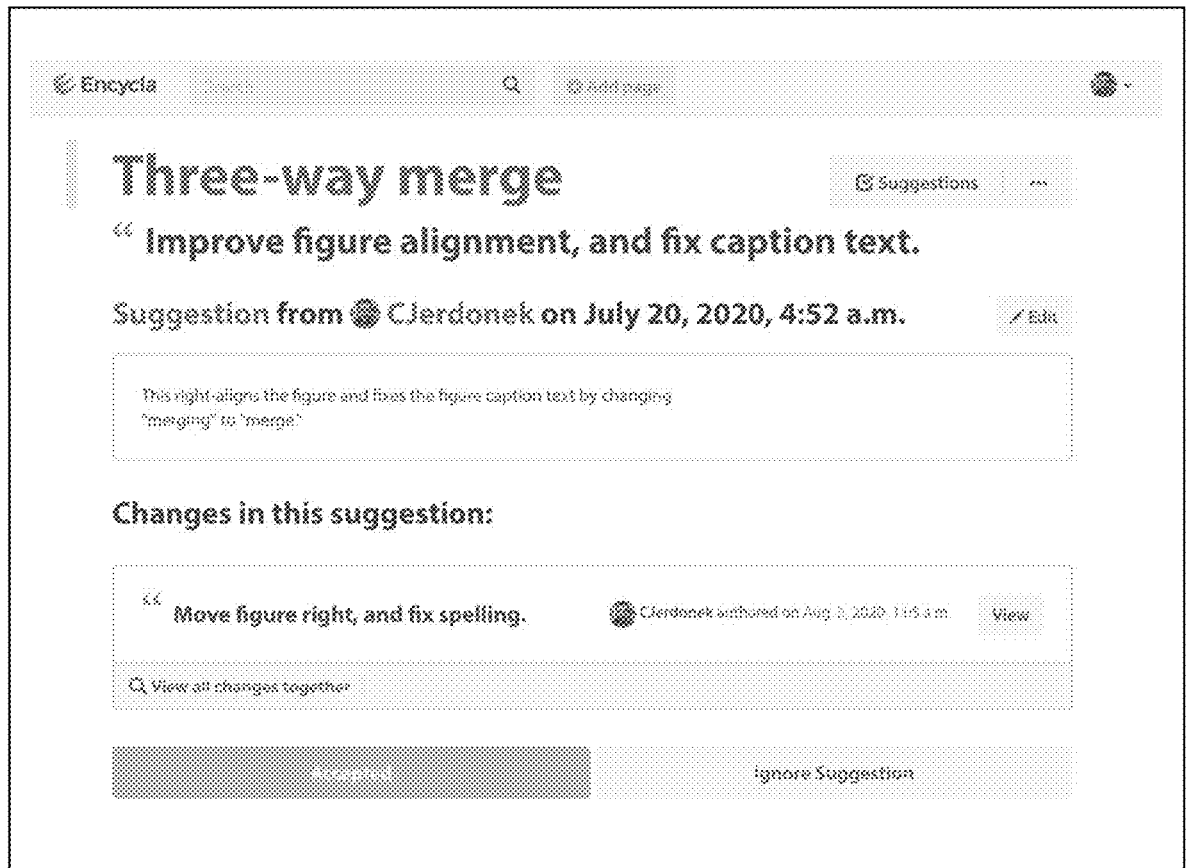
FIG. 14 shows a screenshot of the dialog box after the user has clicked "Accept Suggestion", according to some embodiments.

FIG. 14 shows a screenshot 1400 of the dialog box after the user has clicked "Accept Suggestion" as described above for FIG. 13, according to some embodiments. In this figure, the button shows that the suggestion has been "Accepted" (i.e. merged).

Figure 15:
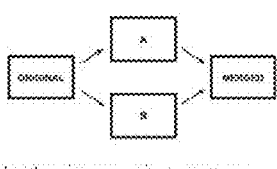
FIG. 15 shows a screenshot of the merged article in the series of screenshots showing an example three-way merge, according to some embodiments.

FIG. 15 shows a screenshot 1500 of the merged article in the series of screenshots showing an example three-way merge, according to some embodiments. The merged article is the result of the user clicking "Accept Suggestion" as described above for FIG. 13. The merged version of the article includes both the changes of version A shown in FIG. 11 and the changes in version B shown in FIG. 12. The changes in version A are the italics that were added to the figure caption text, and the changes in version B are right aligning the figure and changing the word in the caption text from "merging" to "merge."

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed:

1. A method for automatically implementing online merging of changes to a web page document, comprising the steps of:
providing an object of a web page document, wherein the object comprises a digital image object or a text object formatted for display on a web page;

determining an object type of the object of the web page document, wherein the web page document is coded in a markup language;

selecting a set of attributes s of the object type that are to be taken into account during a merging operation involving a plurality of changes to the object, wherein each attribute of the set s is a visual attribute, for each attribute of the set s, determining an original value of the attribute in the document, receiving a plurality of changes to the object, wherein the plurality of changes comprises a first set of changes and a second set of changes to the original values, selecting for each attribute in the set of s, a fallback strategy for merging changes to a value of that attribute;

generating an original key-value mapping for the object, wherein the set of attributes is used to associate with the object a key-value mapping, wherein the key-value mapping comprises, for each attribute of the set s, a key-value of the mapping, where the name of the attribute is the mapping key and the original value of the attribute is the mapping value;

generating a key-value mapping for the object after the first set of changes;

generating a key-value mapping for the object after the second set of changes;

computing a merged attribute value $V_M$ for each attribute in the set of attributes of the object type by:
letting $V_O$, $V_A$, and $V_B$ denote the original value of the attribute of the object, the value of the attribute of the object after the first set of changes, and the value of the attribute of the object after the second set of changes, respectively,
setting $V_M$ to be $V_O$ if $V_A$ equals $V_O$ and $V_B$ equals $V_O$,
setting $V_M$ to be $V_B$ if $V_A$ equals $V_O$ and $V_B$ does not equal $V_O$,
setting $V_M$ to be $V_A$ if $V_A$ does not equal $V_O$ and $V_B$ equals $V_O$ or $V_A$, and
choosing $V_M$ using the fallback strategy selected for the attribute, if neither $V_A$ nor $V_B$ are equal to $V_O$, and $V_A$ and $V_B$ are not equal to each other;

constructing a merged version of the object that incorporates the plurality of changes to the object by:
combining the merged attribute Values for each attribute in the set of attributes, using the attribute names as the keys to construct a merged key-value mapping of attributes, and
updating the document based on the merged key-value mapping of attributes.

2. The method of claim 1 further comprising:
integrating the merged version of the object into an updated web page document.

3. The method of claim 2, wherein the markup language comprises a hypertext markup language (HTML).

4. The method of claim 3, wherein the plurality of changes to the object are asynchronous and independent changes to the HTML content of the web page document.

5. The method of claim 2, wherein the markup language comprises a MARKDOWN markup language.

6. The method of claim 1 further comprising:
for each attribute, choosing a three-way merge strategy as a fallback merge strategy for the attribute.

7. The method of claim 1,
wherein the web page document comprises a document in an online collaboration system, and
wherein the plurality of changes being merged correspond to multiple edits to the document in the online collaboration system.

8. The method of claim 7,
wherein the online collaboration system is for a collaboratively edited online encyclopedia, and
wherein the document comprises an encyclopedia article in the collaboratively edited online encyclopedia.

9. The method of claim 1, wherein the object of the web page document comprises a digital image.

10. The method of claim 9, wherein a digital image attribute comprises the size of the digital image.

11. The method of claim 9, wherein a digital image attribute comprises the alignment of the digital image relative to the web page document containing the digital image.

12. The method of claim 9, wherein a digital image attribute comprises a caption associated with the digital image.

13. A computerized system useful for automatically implementing online merging changes to a web page document, comprising:
a processor;
a memory containing instructions when executed on the processor causes the processor to perform operations that:
provide an object of a web page document, wherein the object comprises a digital image object or a text object formatted for display on a web page;
determine an object type of the object of the web page document, wherein the web page document is coded in a markup language;
select a set of attributes s of the object type that are to be taken into account during a merging operation involving a plurality of changes to the object, wherein each attribute of the set s is a visual attribute,
for each attribute of the set s, determining an original value of the attribute in the document,
receive a plurality of changes to the object, wherein the plurality of changes comprises a first set of changes and a second set of changes to the original values;
select for each attribute in the set of s, a fallback strategy for merging changes to a value of that attribute;
generate an original key-value mapping for the object, wherein the set of attributes is used to associate with the object a key-value mapping, wherein the key-value mapping comprises, for each attribute of the set s, a key-value of the mapping, where the name of the attribute is the mapping key and the original value of the attribute is the mapping value;
generate a key-value mapping for the object after the first set of changes;
generate a key-value mapping for the object after the second set of changes;
compute a merged attribute value $V_M$ for each attribute in the set of attributes of the object type by performing operations that:
let $V_O$, $V_A$ and $V_B$ denote the original value of the attribute of the object, the value of the attribute of the object after the first set of changes, and the value of the attribute of the object after the second set of changes, respectively,
set $V_M$ to be $V_O$ if $V_A$ equals $V_O$ and $V_B$ equals $V_O$,
set $V_M$ to be $V_B$ if $V_A$ equals $V_O$ and $V_B$ does not equal $V_O$,
set $V_M$ to be $V_A$ if $V_A$ does not equal $V_O$ and $V_B$ equals $V_O$ or $V_A$, and choose $V_M$ using the fallback strategy selected for the attribute if neither $V_A$ nor $V_B$ are equal to $V_O$, and $V_A$ and $V_B$ are not equal to each other;

construct a merged version of the object that incorporates the plurality of changes to the object by performing operations that:

combine the merged attribute values for each attribute in the set of attributes, using the attribute names as the keys, to construct a merged key-value mapping of attributes, and update the document based on the merged key-value mapping of attributes.

14. The computerized system of claim 13, wherein the memory containing instructions when executed on the processor, further causes the processor to perform operations that:

integrate the merged version of the object into an updated web page document.

15. The computerized system of claim 14, wherein the markup language comprises a hypertext markup language (HTML).

16. The computerized system of claim 15, wherein the plurality of changes to the object are asynchronous and independent changes to the HTML content of the web page document.

17. The computerized system of claim 14, wherein the markup language comprises a MARKDOWN markup language.

18. The computerized system of claim 13, wherein for each attribute, a three-way merge strategy is chosen as a fallback merge strategy for the attribute.

19. The computerized system of claim 18, wherein the web page document comprises a document in an online collaboration system, and wherein the plurality of changes being merged correspond to multiple edits to the document in the online collaboration system.

20. The computerized system of claim 19, wherein the online collaboration system is for a collaboratively edited online encyclopedia, wherein the document comprises an encyclopedia article in the collaboratively edited online encyclopedia, and wherein the object comprises an image object with a caption text.

* * * * *